United States Patent [19]
Gatta

[11] Patent Number: 5,394,835
[45] Date of Patent: Mar. 7, 1995

[54] PET LITTER HOUSING HAVING LITTER DISPENSER AND DISPOSAL

[76] Inventor: Donald F. Gatta, 5 Donna Rd., Woborn, Mass. 01801

[21] Appl. No.: 71,957

[22] Filed: Jun. 7, 1993

[51] Int. Cl.⁶ ............................................. A01K 1/03
[52] U.S. Cl. ................................ 119/170; 119/706; 119/165
[58] Field of Search ............... 119/161, 162, 163, 164, 119/165, 166, 167, 168, 169, 170, 29, 28.5, 706

[56] References Cited

U.S. PATENT DOCUMENTS

| | | | |
|---|---|---|---|
| 3,119,932 | 11/1963 | Knutston | 116/137 |
| 3,954,086 | 5/1976 | Maness . | |
| 4,027,625 | 6/1977 | Wheeler | 119/170 |
| 4,271,544 | 6/1981 | Hammond | 119/165 |
| 4,299,190 | 11/1981 | Rhodes | 119/170 |
| 4,347,807 | 9/1982 | Reich | 119/29 |
| 4,465,018 | 8/1984 | Mopper . | |
| 4,493,288 | 1/1985 | Van der Kolk . | |
| 4,934,317 | 6/1990 | Pourshalchi | 119/165 |
| 5,080,042 | 1/1982 | Rubin | 119/29 |
| 5,117,780 | 6/1992 | Wooten et al. | 119/162 |
| 5,181,480 | 1/1993 | Dabolt | 119/161 |
| 5,184,568 | 2/1993 | Healey | 119/165 |
| 5,184,575 | 2/1993 | Reinartz | 119/163 |

FOREIGN PATENT DOCUMENTS

| | | | |
|---|---|---|---|
| 0003093 | 7/1979 | European Pat. Off. | 119/170 |
| 264313 | 12/1990 | France | 119/165 |

*Primary Examiner*—Todd E. Manahan
*Attorney, Agent, or Firm*—Ellen C. Childress

[57] ABSTRACT

A pet sanitation station comprises a housing having a main chamber a sliding plate forming a chamber floor located in a collar which sits on a receptacle for collecting soiled litter. A hopper for storing and dispensing clean litter is located in the housing directly above the main chamber. An apertured sliding plate dispenses a controlled amount of clean litter from the hopper onto the floor the main chamber.

5 Claims, 9 Drawing Sheets

Figure 8A

PET LITTER HOUSING HAVING LITTER DISPENSER AND DISPOSAL

FIELD OF THE INVENTION

This invention relates pet relief stations which provide safe, sanitary management of pet excretions.

BACKGROUND OF THE INVENTION

Management of pet excretions is important for health and comfort of a pet and for people in contact with the pet. Pet excrement can harbor such diseases as toxoplasmosis. Pets are beneficial to all aspects of society, especially elderly and children, two groups of people who many find it difficult to handle heavy bags of litter and may be at risk from disease carried by pet excrement.

To manage soiled litter, U.S. Pat. No. 3,111,932 shows a relief station for cats having a raised floor, storage for litter (sand) above the floor, a receptacle placed below a normally closed floor opening, and means for opening the opening when the cat leaves the station. This requires the cat to enter from the front and step on a treadmill to activate the system and for the cat to eliminate over a small hole.

U.S. Pat. No. 3,954,086, incorporated herein by reference, discloses a litter box having a hopper fitted with a rotating slotted tube to dispense litter onto a shutter surface, which opens by electronic circuitry after the cat leaves the surface and requires location near an outlet. Further, some pets such as rabbits are prone to chew on cords and thus be endangered.

U.S. Pat. No. 4,465,018, discloses a pet relief station with a hopper which dispenses a continuous stream of litter onto a plastic sheet attached at either end to a takeup and feed roll. The station has a housing which provides effective control of scattered litter. However, the station is complicated to clean and uses a motor to activate the rollers.

U.S. Pat. No. 4,493,288 discloses a hopper and a treadle mechanism which removes the lower strata of clumped litter. This does not provide for complete removal of waste and requires a complex mechanical system that could conceivably catch on a digging cat's paws.

There exists a need for a safe, sanitary, easily manufactured and operated pet sanitation station.

SUMMARY OF THE INVENTION

This pet sanitation station has a walled housing and an entrance in one wall which leads to a main chamber. A sliding plate forms the chamber floor and is located in a collar which sits on a receptacle for collecting soiled litter. A hopper for storing and dispensing clean litter is located in the housing directly above the main chamber and an apertured sliding plate provides a means for dispensing a controlled amount of clean litter from the hopper onto the floor the main chamber. An easily removed cover provides access for filling the hopper.

Prior to use, an operator dispenses a controlled amount of litter onto the main chamber floor for current use. The pet enters through the entrance, eliminates and then leaves. When the current use litter becomes soiled, the chamber floor is slid outward, letting the soiled litter fall into a collection receptacle, and then returned to an inward position. Fresh litter is dispensed from the hopper. The hopper is designed to hold the contents of a bag of litter, as is the collection receptacle, thus allowing for a substantial amount of time before refilling and emptying is required. There is no need to contact soiled litter at any time. The sliding plates are provided with locking devices to prevent accidental dispensing or disposal of litter. The walls are carpeted to provide a scratching surface for cats.

The unit is easily manufactured, maintained and cleaned. It can be used with a wide variety of litter materials and is designed to require a minimum of floor space.

DETAILED DESCRIPTION OF THE INVENTION

Figure 1:
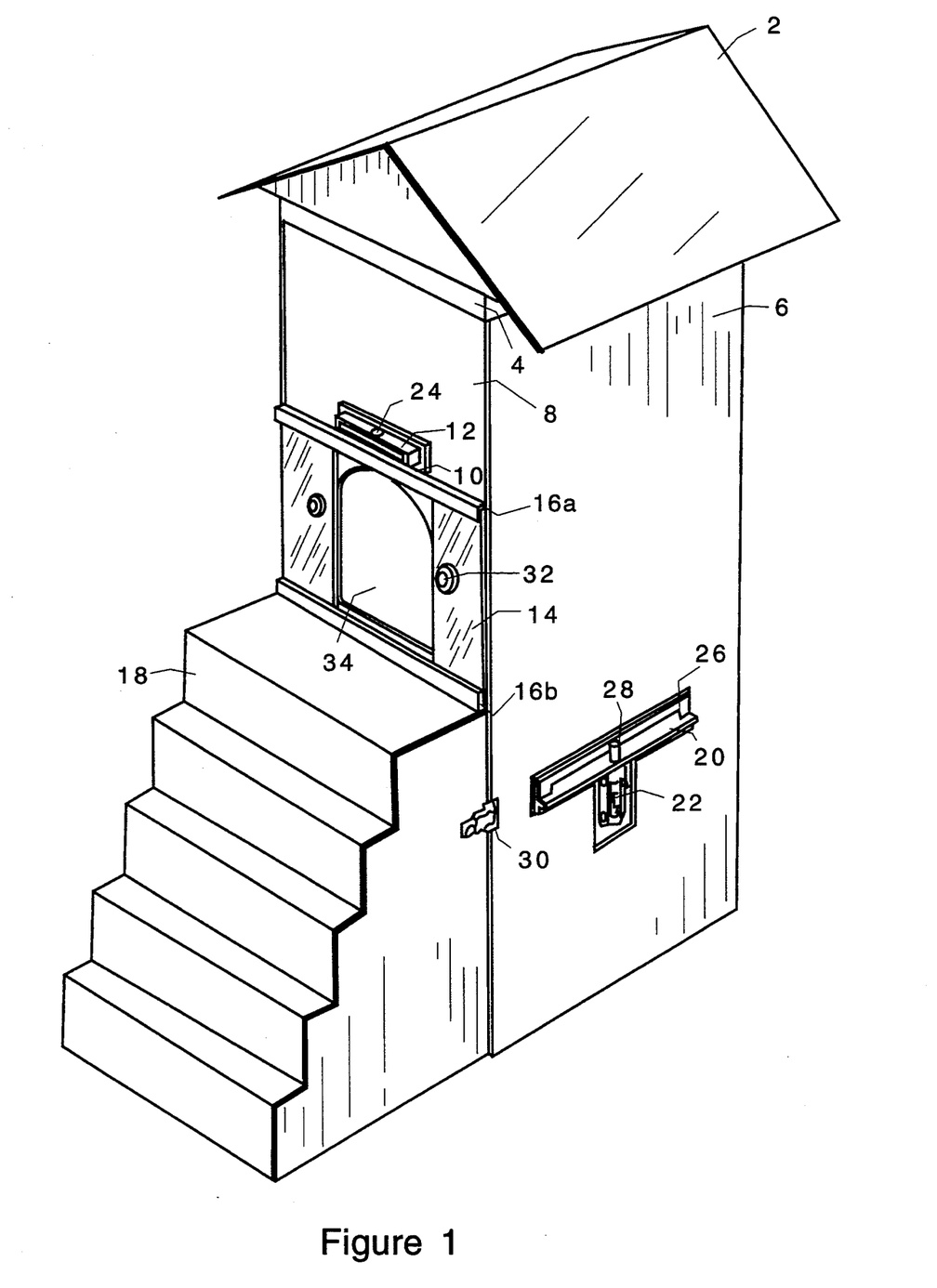
FIG. 1 is a perspective view of a pet sanitation device according to the invention.
Figure 2:
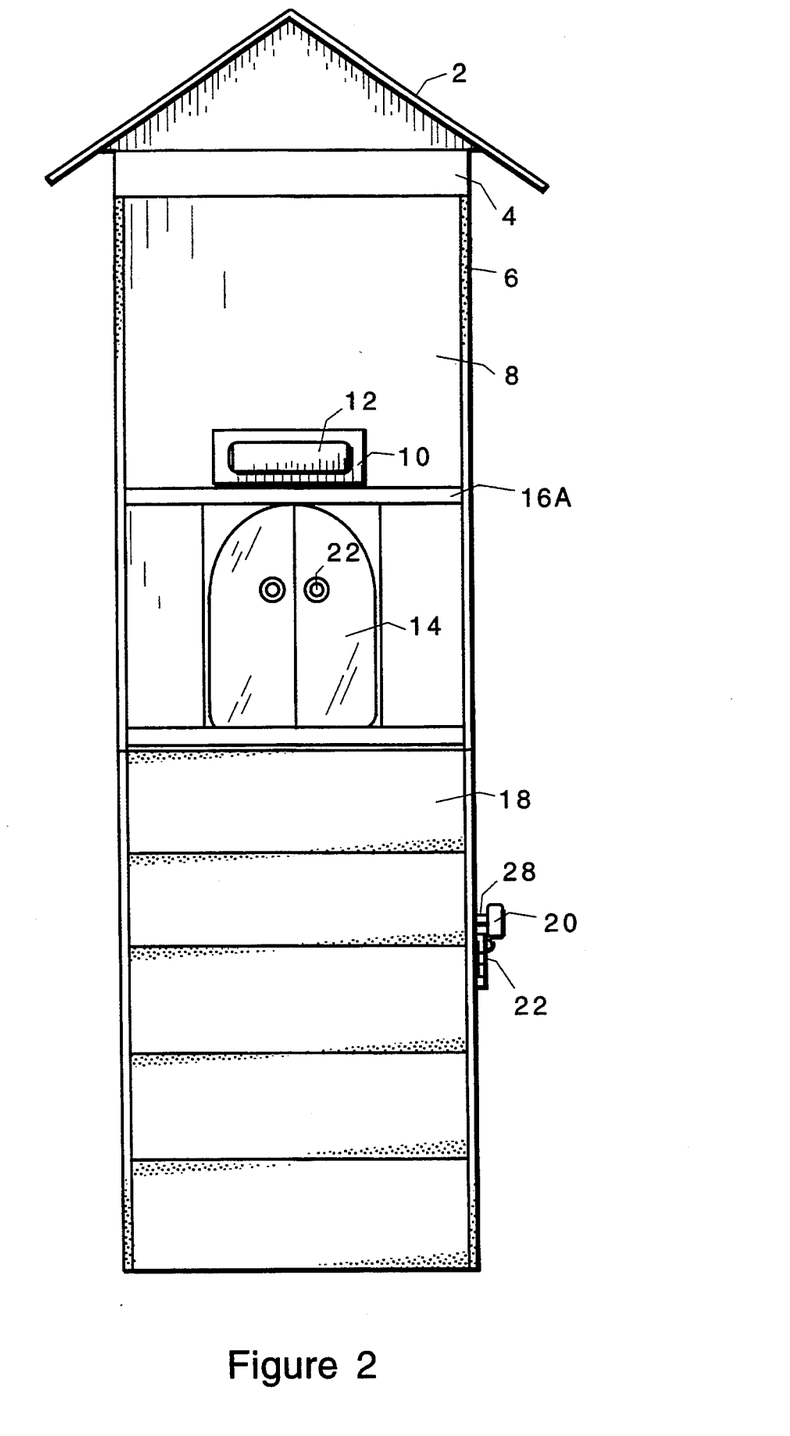
FIG. 2 is a frontal view of a pet sanitation device according to the invention.
Figure 3:
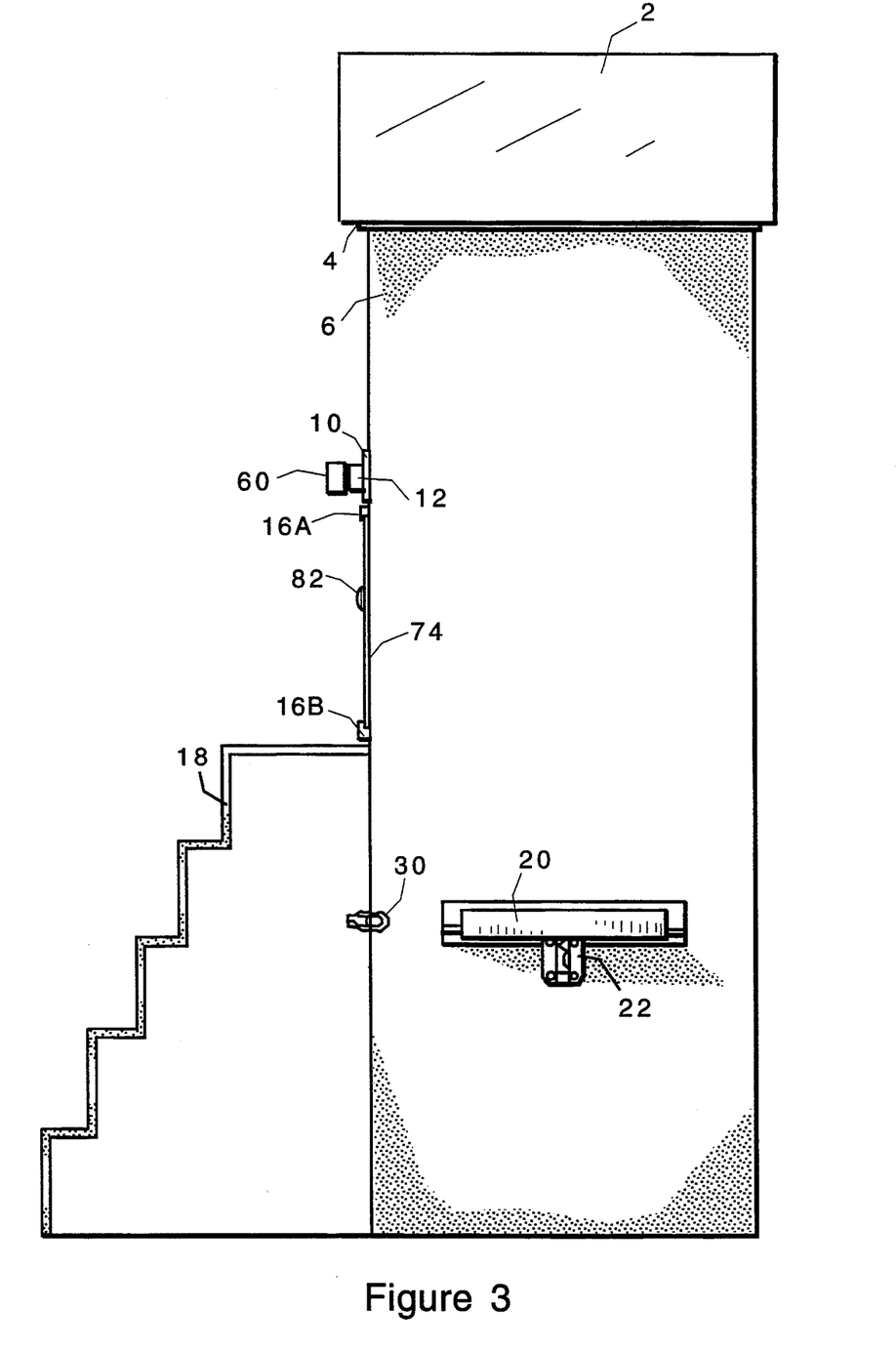
FIG. 3 is a side view of a pet sanitation device according to the invention.

The housing of the pet sanitation device shown in FIGS. 1 through 3 has a front wall 8 and carpet covered side walls 6 for scratching exercise of a cat. The cover 2 has a peeked roof and edged support 4 which rests on the housing. A slotted face plate 26 allows access for a slideable plate 20. Located adjacent to the plate 20 is a sliding bolt 22 with a sliding pin 28 which engages an aperture 102 for locking the plate securely. A second slotted face plate 10 on the front wall 8 of the housing provides access to second sliding plate 12 secured by a pin 24. A set of stairs 18 is secured to housing side walls 6 by a clasp 30. At the stair top 18 is an entrance 34 with doors 14 which slide in tracks 16A, 16B. The doors are equipped with knobs 32 or apertures and shown as open in FIG. 1 and closed in FIG. 2. Doors control dust when litter is dispensed. Other doors such as swinging doors can be used.

Figure 4:
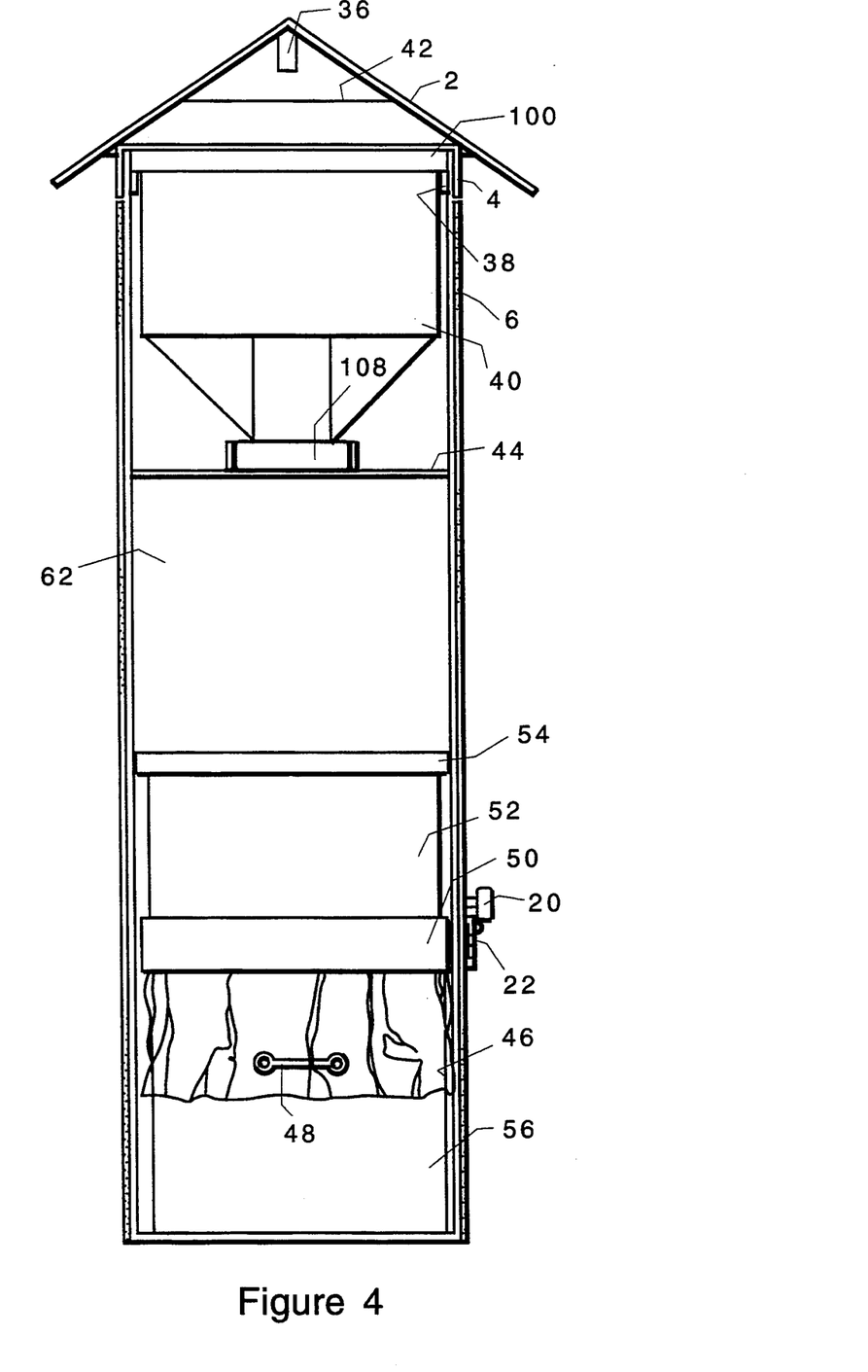
FIG. 4 is a back view of a pet sanitation device according to the invention.

A rear view of a device is shown in FIG. 4. A back wall is optional. The cover 2 has braces 36 and 42. In an upper chamber, a hopper 40 has an upper rim 100 which rests on a support 38. The hopper tapers toward a slide guide 108 which rests above an upper chamber floor 44. At the base is a frame 56 which may be a container having a handle 48 for easy removal. In this version, the frame 56 may be removed from the device rear. The lower edge 50 of a collar 52 extends around the perimeter of the frame 56 over a liner bag 46. Between the upper portion 54 of the collar and upper floor 44 is a main chamber 62.

Figure 5:
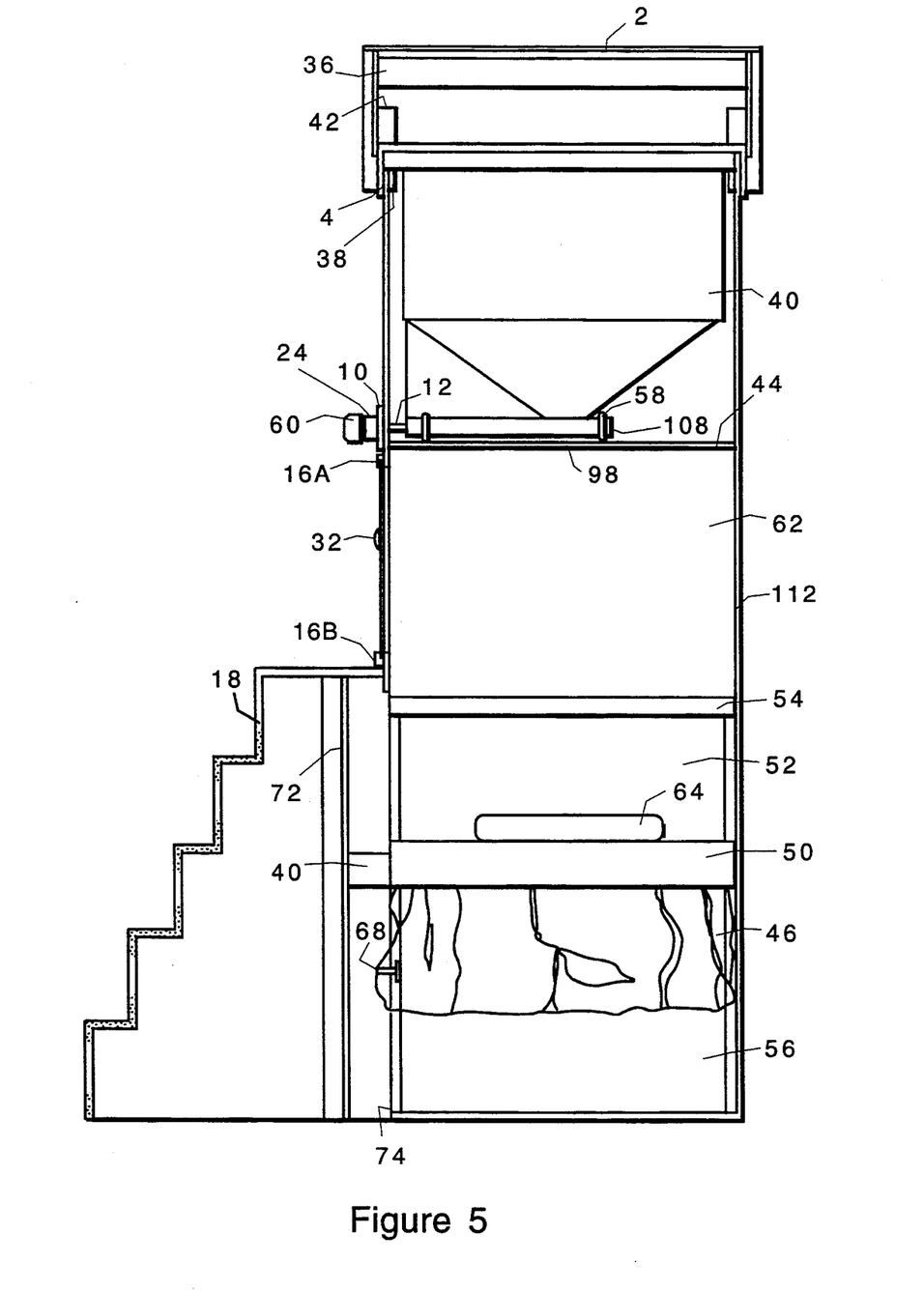
FIG. 5 is a side cross sectional of a pet sanitation device according to the invention.

In a version shown in FIG. 5 the handle 68 is oriented towards the front of the device. The stairs 18 have an inner wall 72 to which is attached a spacer 70. When the stair is closed, the spacer 70 securely presses lower edge 50 of the collar 52 against a housing rear wail 112. To empty soiled litter 88 from the frame 56 which rests on the floor 74, the stair 18 is moved and the bag 46 emptied from the front. A slot 64 in the collar is provided for the slide 20 (see FIG. 6).

The slide guide 108 has reinforcing ridges 58 and guides dispensing plate 12 now provided with a handle 60. An aperture 98 in the upper floor 44 is located directly below hopper 40.

Figure 6:
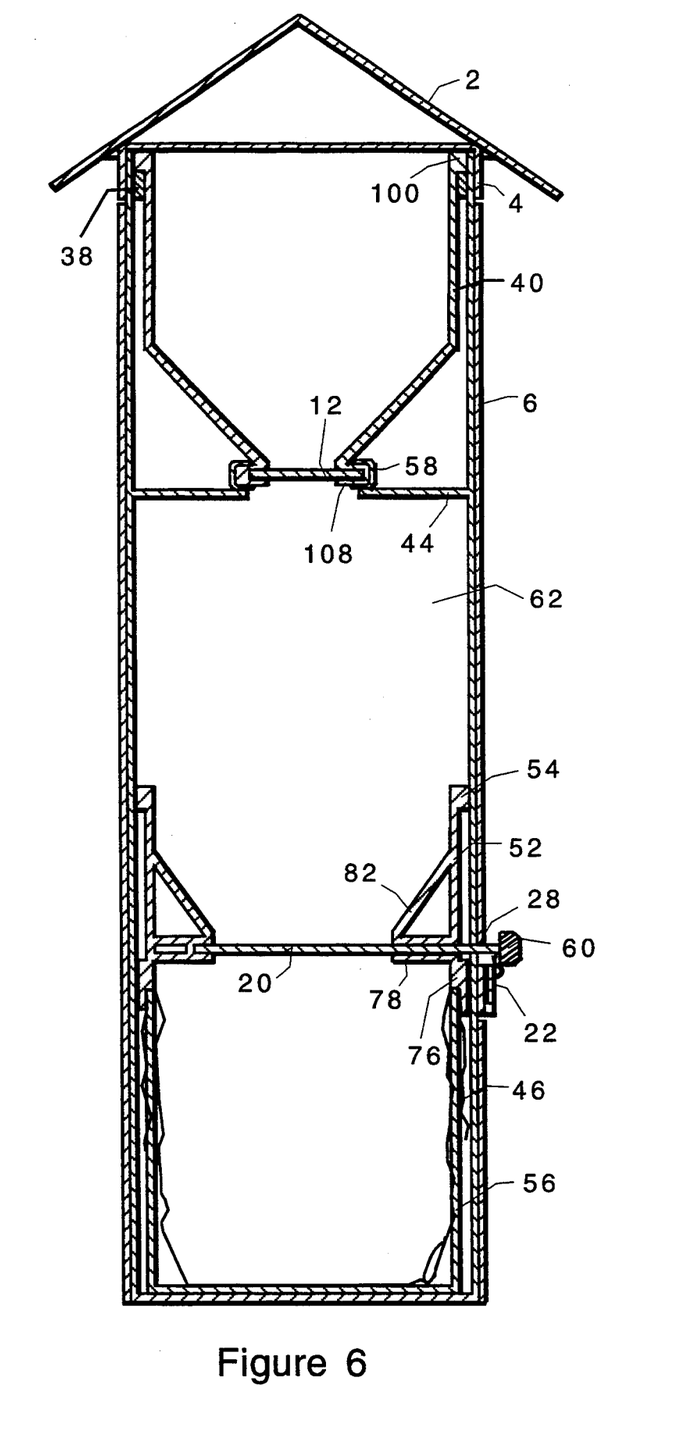
FIG. 6 is a back cross sectional view of a pet sanitation device according to the invention.

FIG. 6 shows a cross section of the collar 52. Upper portion 82 has a triangular cross section which directs litter toward the upper surface of the sliding plate 20. A horizontal lip 78 and the surface of the upper portion 82 form a track for the sliding plate 20. The plate forms a portion of the main chamber floor. The upper lip 54 of the collar 52 stabilizes the collar against the side walls 6 of the housing and a ridged lower wall 76 rests on the frame 56 to secure the bag 46.

Figure 7:
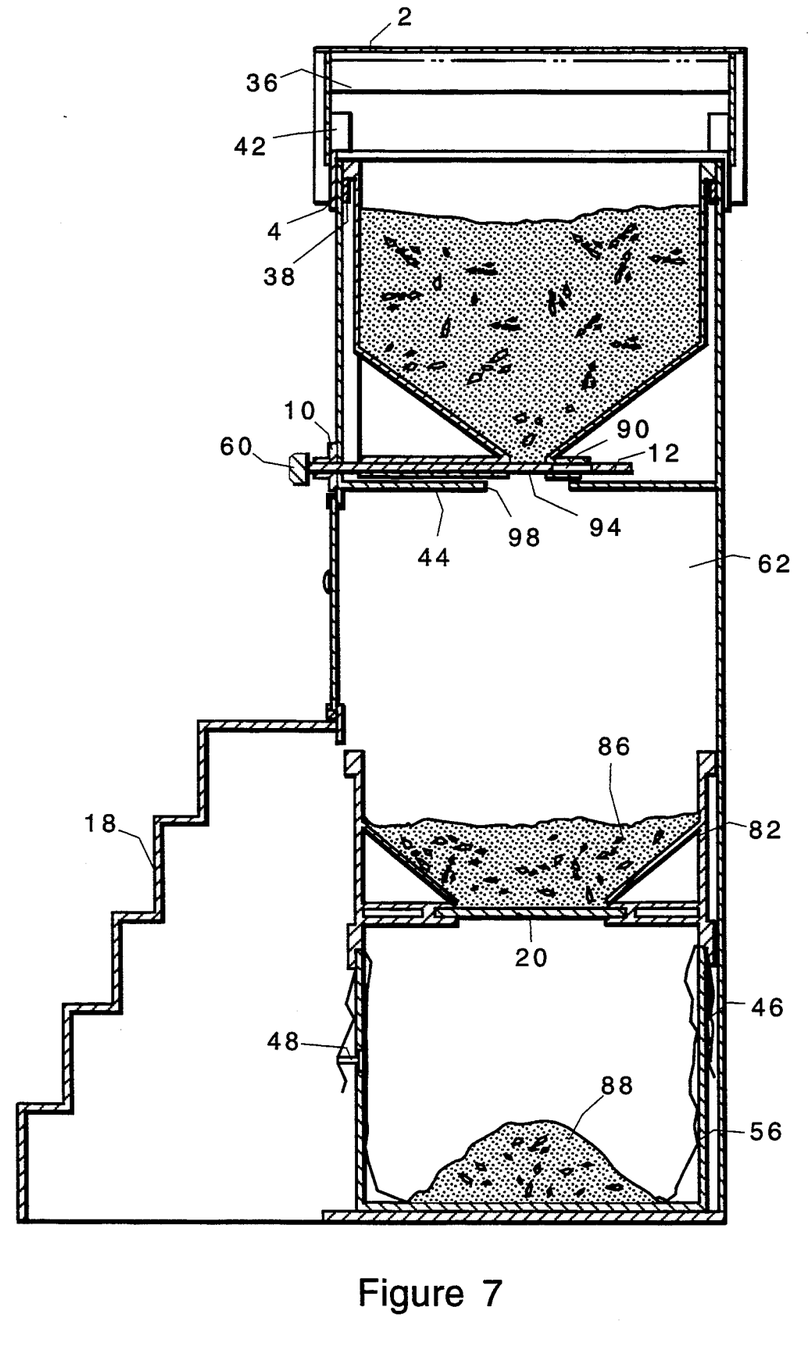
FIG. 7 is a side cross sectional view of a pet sanitation device according to the invention showing litter location.

FIG. 7 shows the location of litter during use of the house. Clean reserve litter 84 is located in the hopper 40. Litter for current use 86 rests on main chamber floor. Soiled litter is stored until disposal in the frame 56. When litter for current use 86 becomes soiled, the slideable emptying plate 20 is pulled back and soiled litter falls into a bag 46. The emptying slide 20 is returned to the inward position and secured in place by the pin of the sliding bolt 22. The dispensing plate 12 is then pulled forward to a position defined by a pin slot 104 and stop pin 24 which places a large aperture 90 under the hopper opening, until a desired amount of litter is dispensed from the hopper 40 through the aperture 90, through an opening 94 in the guide 108 and through the aperture 98 in the upper floor. The slideable dispensing plate 12 is then returned to its original position.

Figure 8:
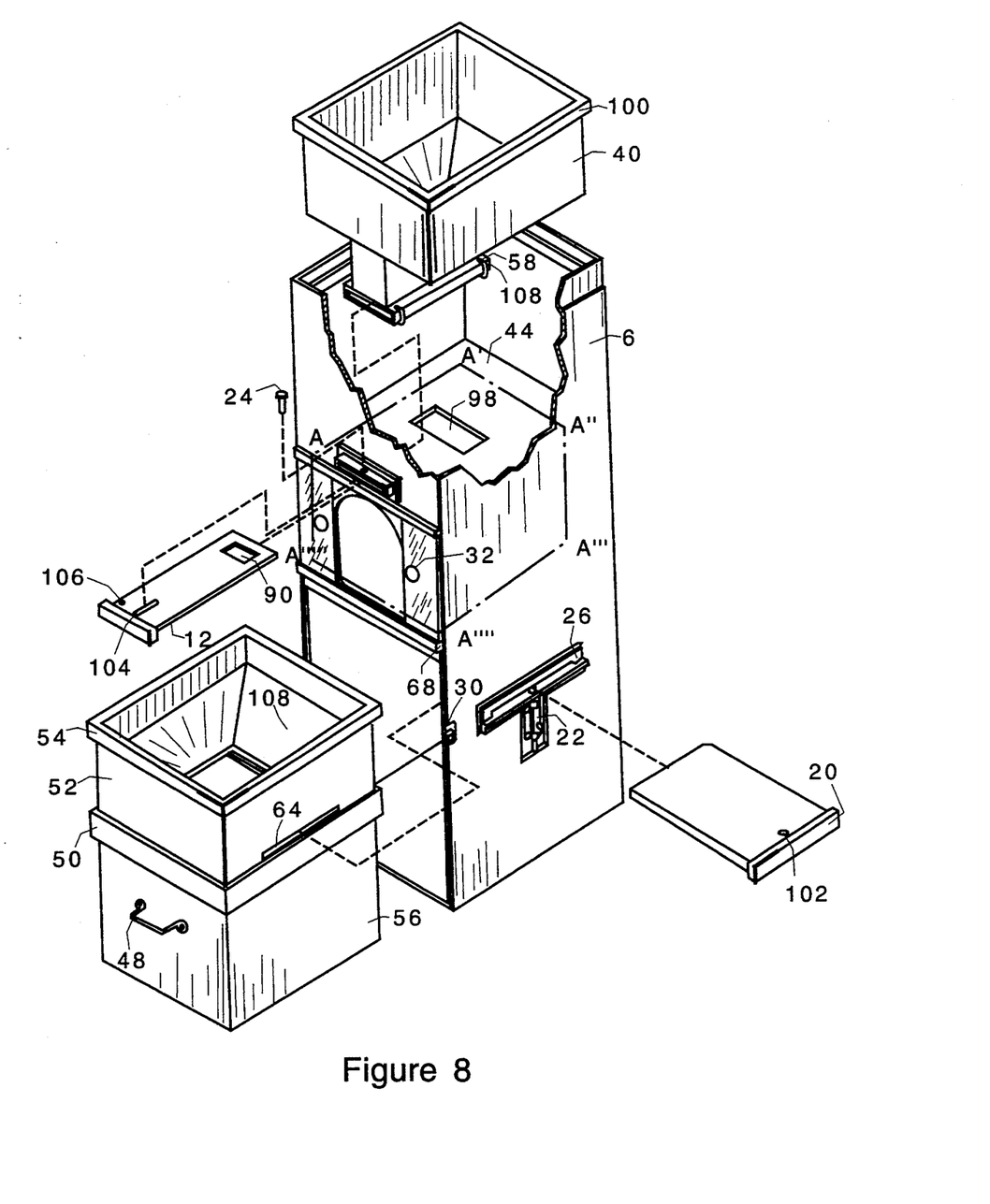
FIG. 8 is an exploded view of a pet sanitation device according to the invention.
Figure 8A:
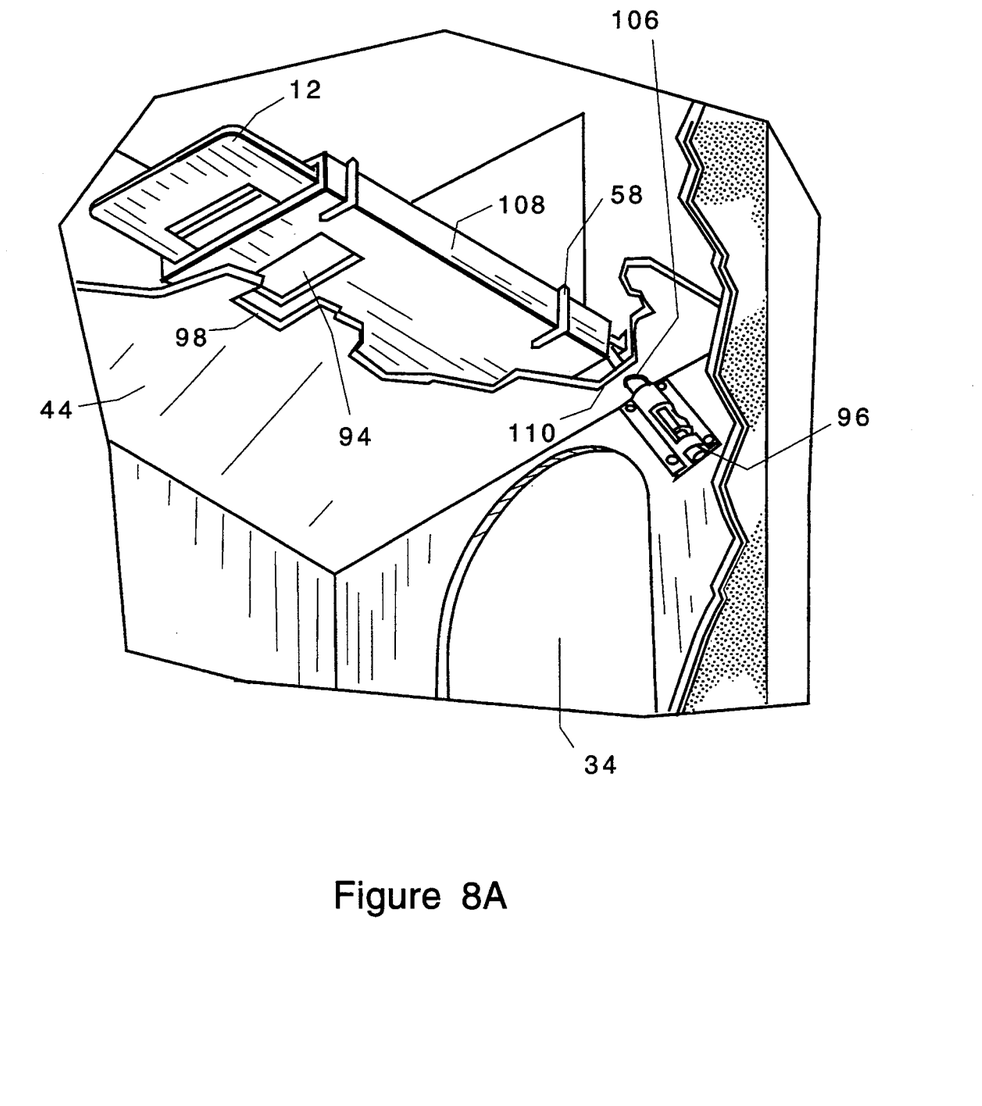
FIG. 8A is a cut away sectional view from inside the main chamber of FIG. 8 while facing the door and looking upward with a portion of the upper floor removed shown by section line along line A'A"A"'A"-"A""A""".

FIG. 8A shows a detail of a locking mechanism located in the main chamber 62 which prevents children from accidently dispensing the contents of the hopper 40. A sliding bolt 96 is placed on the inner front wall adjacent to the upper floor 44. The bolt 96 can be slid through an aperture in the floor 110 to an aperture 106 in the slide. While easily released by an adult, unobvious placement deters children from dispensing the total contents of the hopper 40.

Suitable materials for the construction of the station include plastics and metals for the housing and other rigid parts, and fibrous materials for the scratching areas.

A number of variations are possible without deviating from the basic embodiments. For example, in place of the dispensing slide on the hopper, a rotating tube such as is disclosed in U.S. Pat. No. 3,954,086 may be substituted. Also a variety of doors such as swinging doors may be substituted for the sliding doors. A ramp may be substituted for the stairs, or the stairway could be designed in a spiral formation. The cover can be flat, and other simple pin locks could be substituted for sliding bolts.

The above described invention provides sanitary, easily manufactured and maintained pet sanitation station.

What is claimed is:

1. A pet sanitation station comprising:
   a housing having at least a front wall and two side walls;
   at least one entrance in one of said walls, leading to a main chamber;
   a slideable plate forming at least a section of the floor of said main chamber;
   a receptacle for collecting soiled litter, located in said housing below said main chamber;
   a hopper for storing and dispensing clean litter, located in said housing above and over said main chamber;
   means for dispensing a controlled amount of clean litter from said hopper onto the floor of said main chamber, where a pet may eliminate; wherein said dispensing means is an apertured slideable plate having a first aperture for allowing flow of litter, and a second aperture for engaging a lock pin;
   wherein said dispensing means is provided with a locking means; and
   a cover for providing access to said hopper.

2. A pet sanitation station comprising:
   a housing having at least a front wall and two side walls;
   at least one entrance in one of said walls, leading to a main chamber;
   a slideable plate forming at least a section of the floor of said main chamber;
   a receptacle for collecting soiled litter, located in said housing below said main chamber;
   a hopper for storing and dispensing clean litter, located in said housing above and over said main chamber;
   a slideable plate for dispensing a controlled amount of clean litter from said hopper onto the floor of said main chamber, where a pet may eliminate; and
   a cover for providing access to said hopper;
   wherein said plate has an aperture; and a pin slideable into said aperture for locking said plate.

3. A pet sanitation station comprising:
   a housing having a front wall and two side alls, wherein said side walls are provided with carpet for scratching.;
   an entrance in said front wall, leading to a main chamber;
   a slideable plate forming the floor of said chamber:
   a receptacle for collecting soiled litter, located in said housing below said main chamber;
   a hopper for storing and dispensing clean litter, located in said housing over said main chamber:
   an apertured slideable plate for dispensing clean litter from said hopper onto said floor;
   stairs for accession said entrance; and
   a cover for providing access to said hopper.

4. The station of claim 3 wherein said receptacle for collecting soiled litter comprises:
   a frame having an upper edge and a collar having a lip, said lip engaging said upper edge of said frame, such that a bag may be secured between said frame and said collar.

5. The station of claim 4 wherein said dispensing plate and slideable floor plate are lockable.

* * * * *